July 31, 1951
H. LYONS
2,562,322
MOTOR GOVERNOR
Filed March 22, 1949
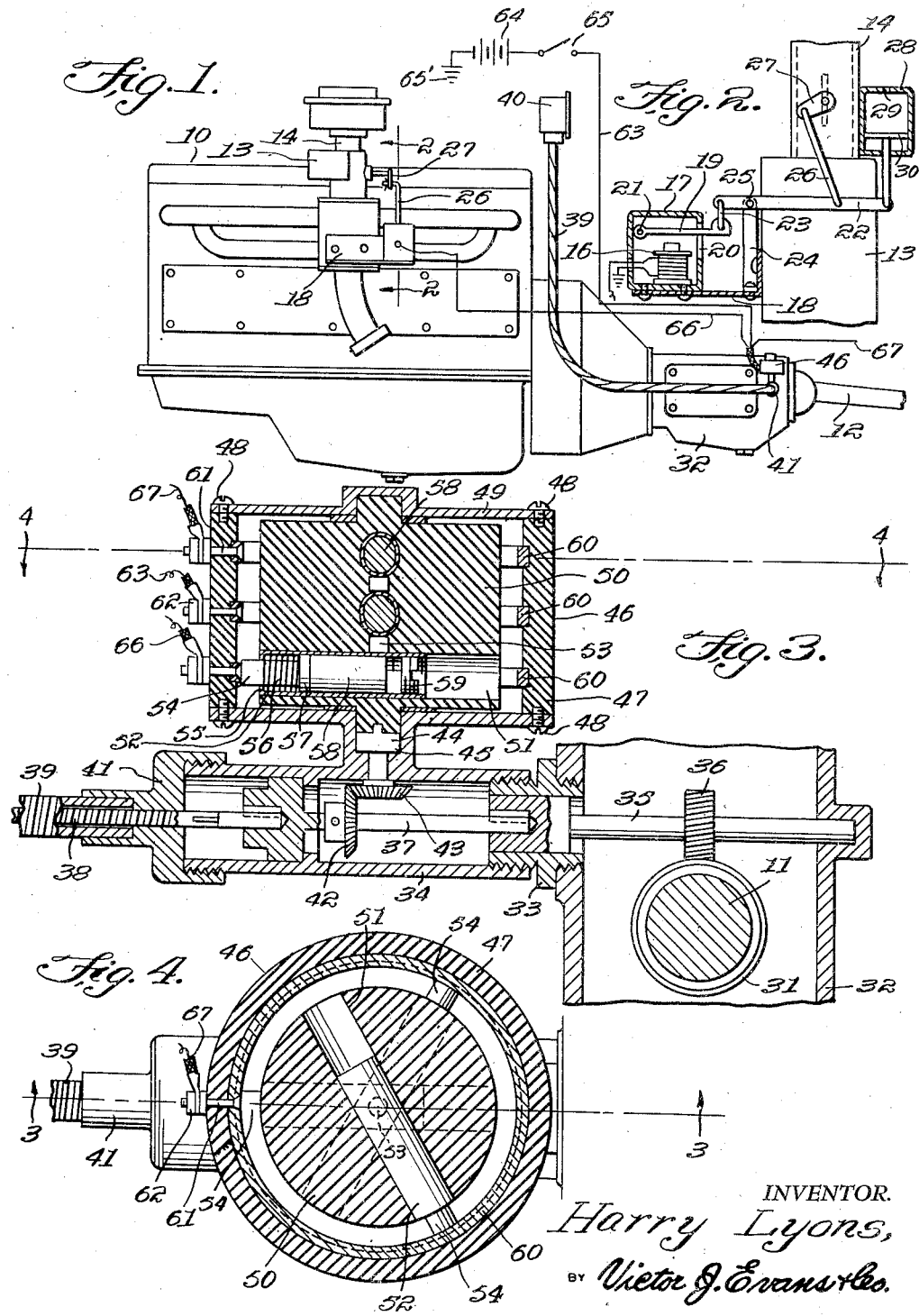
INVENTOR.
Harry Lyons,
BY Victor J. Evans & Co.
ATTORNEYS Patented July 31, 1951

2,562,322

UNITED STATES PATENT OFFICE 2,562,322

MOTOR GOVERNOR

Harry Lyons, Fayetteville, Ark.

Application March 22, 1949, Serial No. 82,788

3 Claims. (Cl. 200—80)

This invention relates to vehicles, and more particularly to a governor for controlling the speed of a vehicle.

The object of the invention is to provide a governor for a vehicle engine which will prevent the vehicle from exceeding a predetermined speed.

Another object of the invention is to provide a centrifugal governor for a vehicle and which is adapted to prevent the flow of fuel to the vehicle engine when the speed of the vehicle exceeds a predetermined limit.

A further object of the invention is to provide a speed control mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of an internal combustion engine equipped with the speed control mechanism, according to the present invention;

Figure 2 is an enlarged sectional view taken on the line 2—2 of Figure 1;

Figure 3 is an enlarged sectional view taken on the line 3—3 of Figure 4;

Figure 4 is an enlarged sectional view taken on the line 4—4 of Figure 3.

Referring in detail to the drawings, the numeral 10 designates a conventional internal combustion engine of a vehicle and the engine drives the propellor shaft 11 which is arranged in a housing 12. The engine 10 includes a carburetor 13 and a conduit 14 for conveying fuel therethrough. A throttle valve 15 serves to control the flow of fuel through the conduit 14, and the throttle valve 15 is ordinarily controlled by the usual hand or foot controls.

The mechanism of the present invention serves to move the throttle valve 15 to thereby prevent flow of fuel through the conduit 14 when the speed of the vehicle exceeds a predetermined limit. More specifically, the present invention is directed to an electrically operated governor switch for actuating a solenoid 16 which is supported in a casing 17, the casing 17 being secured to a bracket 18 which projects from the carburetor 13. An arm 19 projects through an opening 20 in the casing 17, and the arm 19 has one of its ends pivotally connected to the interior of the casing 17 as at 21. The other end of the arm 19 is connected to a link 22 by means of a coupling 23, the link 22 being pivotally connected to a post 24 by a pin 25. A lever 26 has one of its ends connected to the link 22 and its other end connected to a crank 27, the crank 27 being connected to the throttle valve 15, whereby upon energization or actuation of the solenoid 16, the armature 19 will be pivoted downwardly to thereby block the flow of fuel through the conduit 14.

For retarding too quick an action of closing movement of the throttle valve 15, a dash pot 28 is secured to the side of the conduit 14, there being a bleed opening 29 in the dash pot. The piston 30 in the dash pot 28 is connected to the free end of the link 22. Thus, when the link 22 is actuated, the piston 30 is moved to cause an ingress or egress of air through the opening 29 to retard too quick an opening movement of the throttle valve 15 and thus promote smoothness of operation of the internal combustion engine.

The propeller shaft 11 carries a plurality of exterior gear teeth 31, Figure 3, and the propeller shaft projects into a gear casing 32. A threaded coupling 33 connects a hollow housing 34 to the gear casing 32. A shaft 35 has mounted thereon a gear 36 which meshes with the gear teeth 31 of the propeller shaft 11 whereby rotation of the propeller shaft 11 causes rotation of the shaft 35. Rotatably supported in the housing 35 is a shaft 37, the shaft 37 having one of its ends connected to an end of the shaft 35. A flexible cable 38 is encased in a tubular member 39, and the cable 38 extends to the vehicle speedometer 40. The shaft 38 extends rotatably through a fitting 41 and is connected to the end of the shaft 37.

The shaft 37 carries a beveled gear 42 which is arranged in meshing engagement with a bevel gear 43 that is carried by a short shaft 44. The shaft 44 projects through the bottom member 45 of a switch housing 46. The switch housing 46 includes an annular side member 47 which is secured to the bottom member 45 by suitable securing elements, such as screws 48. A top plate 49 is supported on the side member 47 and secured thereto by screws 48. The housing 46 is fabricated of a material non-conductive of electricity such as Bakelite, and rotatably arranged in the switch housing 46 is a rotor 50 which is connected to the shaft 44.

The rotor 50 is fabricated of a material non-conductive of electricity and is provided with three superimposed spaced recesses 51, there being a metal sleeve 52 snugly seated in each of the recesses 51. A suitable conductor plug 53 electrically connects the adjacent sleeves 52 together. Slidably positioned in each of the sleeves 52 is a carbon brush 54. The end of the sleeve 52 is crimped as at 55, and a coil spring 56 is circumposed on the carbon brush 54 and has one of its ends abutting the crimped portion 55 of sleeve 52. The other end of the spring 56 is arranged in engagement with a shoulder 57 which is formed integral with the carbon brush 54, so that the spring 56 normally urges the carbon brush 54 inwardly into the sleeve 52. Slidably arranged in each of the sleeves 52 is a governor or centrifugal weight 58 which is adapted to force the carbon brush 54 against the tension of the spring 56 as the rotor 50 is rotated. The relative position of the centrifugal weight 58 in the sleeve 52 can be adjusted by means of a set screw 59 which is threaded into the other end of the sleeve 52, Figure 3.

Arranged in spaced superimposed relation within the housing 46 and supported by the side member 47 is a plurality of metal contact rings 60 which are adapted to be engaged by the carbon brushes 54 when the speed of the rotor 50 exceeds a predetermined limit. A suitable rivet 61 extends from each of the rings 60 through the insulated housing 46, there being a binding post or terminal 62 arranged on the outer end of each of the metal rivets 61.

The intermediate binding post 62 is electrically connected by a cable 63 to the vehicle battery 64, there being a suitable switch 65 arranged in the line 63. The battery 64 is suitably grounded, as at 65, Figure 1. The lowermost binding post 62 is electrically connected to the solenoid 16 by a cable or conductor wire 66, while the other or uppermost binding post 62 may be connected by a cable 67 to a light, bell, or horn, or other similar device.

In operation, the propeller shaft 11 is normally rotated by the engine 10, and this rotation of the propeller shaft 11 causes the speedometer 40 to be actuated and it also causes the rotor 50 to be rotated. During normal operation of the engine, the solenoid 16 will not be energized so that flow of fuel through the conduit 14 will be permitted whereby the engine can be operated as desired. In the event that the vehicle speed exceeds a predetermined limit, the rotor 50 will be turned at such a speed so as to cause the centrifugal weights 58 to move the carbon brushes 54 out into contact with the metal rings 60 whereby the electrical circuit will be completed to the solenoid 16 so that the armature 19 will be attracted thereto to thereby close the throttle valve 15 and prevent the further flow of fuel to the engine. When the vehicle speed again drops below this speed, the carbon brushes 54 will return to their normal position by virtue of the coil springs 56 acting thereon to thereby deenergize the solenoid 16 so that the throttle valve 15 can be controlled by the hand or by the foot pedal as in the usual manner.

From the foregoing, it is apparent that a speed control mechanism has been provided which is controlled by the speed of the vehicle. The switch housing is constructed so that dirt, moisture, and other contaminants cannot clog the moving parts thereof and the device does not effect performance of the engine during normal driving. The carbon brushes 54 are normally not in contact with the rings 60 so that there will be a minimum of wear between the parts. If desired, the device may be constructed so that a single shaft extends through the rotor 50 and has one of its ends in engagement with the shaft 44 and its other end in engagement with the speedometer cable 38 whereby the rotor and speedometer will be actuated by a single shaft.

While I have shown and described a preferred embodiment of my invention, this is by way of illustration only and I consider as my own all such modifications in construction as fairly fall within the scope of the appended claims.

I claim:

1. In a governor switch for a vehicle, a housing fabricated of insulating material, a rotor positioned in said housing and driven by the speedometer driven gear, a plurality of fixed terminals arranged exteriorly of said housing and supported by the latter, one of said terminals being connected to a source of electrical energy, a plurality of metal contact rings arranged within said housing and supported by the latter, each of said rings being electrically connected to a complemental terminal, a plurality of spaced, openended sleeves carried by said rotor, a carbon brush carried by each of said sleeves and mounted for movement into electrical contact with said rings when the speed of said rotor exceeds a predetermined limit, and a governor or centrifugal weight positioned in each of said sleeves for urging said carbon brushes into contact with said rings when the speed of said rotor exceeds a predetermined limit.

2. The structure of claim 1 and further including a coil spring in each of said sleeves for normally urging said carbon brushes out of engagement with said rings.

3. In a governor switch for a vehicle, a housing fabricated of insulating material and including a bottom, an annular side member secured to said bottom, a top plate arranged in spaced parallel relation above said bottom and secured to said side member, a rotor rotatably positioned in said housing and operatively connected to said vehicle engine, there being a plurality of superimposed spaced recesses arranged in said rotor, a metal sleeve seated in each of said recesses, a conductor plug connecting said sleeves to each other, a carbon brush slidably positioned in each sleeve, each of said sleeves having a crimped edge, a coil spring circumposed on each carbon brush and having an end abutting the crimped end of said sleeve, a governor weight slidably arranged in each of said sleeves, an adjusting set screw arranged in engagement with each of said sleeves, a plurality of spaced parallel metal contact rings arranged in said housing and supported by said side member and adapted to be engaged by said carbon brushes when the speed of the rotor exceeds a predetermined limit, and a terminal electrically connected to each of said rings.

HARRY LYONS.

REFERENCES CITED

The following references are of record in the file of this patent:

UNITED STATES PATENTS

| Number | Name | Date |
|---|---|---|
| 1,075,987 | McMahon | Oct. 14, 1937 |
| 2,208,904 | Knight | July 23, 1940 |

FOREIGN PATENTS

| Number | Country | Date |
|---|---|---|
| 604,591 | Germany | Oct. 24, 1934 |